Aug. 6, 1963          D. T. BARRY          3,100,269

QUICK ACTING GATE FOR VOLTAGE OR CURRENT DISCHARGE

Filed May 25, 1961

*INVENTOR.*
DAVID T. BARRY

BY
ATTYS.

United States Patent Office 3,100,269
Patented Aug. 6, 1963

3,100,269
QUICK ACTING GATE FOR VOLTAGE OR CURRENT DISCHARGE
David T. Barry, Dallas, Tex., assignor to the United States of America as represented by the Secretary of the Navy
Filed May 25, 1961, Ser. No. 112,737
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates generally to the recycling of an integrating element used within electronic computers, and more particularly to an arrangement for rapidly discharging charged voltage elements or current storage elements. These integrators are most commonly found in the form of a capacitor. In typical operation, signals are applied across the integrating capacitor. The charge presented by the signals is stored as a collective charge on the capacitor, the total collective charge appearing on the capacitor after a given interval of time is representative of the total charge supplied by the signals which were applied across that capacitor during such period of time. After each integrating interval, it is necessary to discharge the accumulated charge existing upon the capacitor so that a new interval of integration may be begun. The operation of discharging the capacitor and preparing the integrator for a new interval of integration is commonly known as recycling of the integrator. A rapid recycling of the integrator is highly desirable in order that a new period of the integration may be begun with the least possible delay.

In the prior art, various gating arrangements employing mechanical relays, vacuum tubes, transistors, and conventional diodes have been used for the purposes of recycling. Mechanical relays have proved inherently slow and, therefore, impractical in light of the present high speeds attained by computing machanisms. Vacuum tube, transistor, and conventional diode gating arrangements have proved more satisfactory in speed of operation, but fail to attain the micro-second and fractional micro-second speed of operation attainable by the other computer components.

The relatively slow recycling of an integrator becomes a problem in both digital and analog computers which employ such integrators. In the digital computer, the data appear as discrete signal pulses of uniform shape, size, and time duration. These pulses are usually separated by a no-signal interval of equal time duration with the signal pulses. Due to the high speed at which present day digital computers may handle data, the recycling operation should be accomplished at speeds comparable to the speed of data flow in the remainder of the computer. With existing systems for recycling, the recycling operation may require a time interval equal to a multiple of incoming signal pulse time widths; thus the flow of signals to the integrator must be suspended for that period of time necessary to complete recycling thereby causing delay in the entire computing and data handling operation of the computer. A device which would accomplish the entire recycling operation in the interval between two signal pulses would make possible an integrating operation in which it would be unnecessary to delay the flow of data in the form of signal pulses thereby making possible continuous operation of the integrator.

The same considerations apply to the analog computer in which the data appear in a continuous fashion as a signal magnitude level. Recycling of an integrator in the analog computer requires interruption of the analog signal until the recycling is completed thus losing that portion of the signal. A decrease of time required to recycle the integrator will therefore decrease the signal lost to the integrator operation.

It is an object of this invention to provide an improved means for rapidly discharging charge voltage or current storage elements by utilizing the avalanche characteristics of a Zener diode with which a recycling of the storage elements may be completed on command with greater speed.

Various other objects and advantages will be apparent from the following description of one embodiment of the invention, and the novel features will be particularly pointed out hereinafter in connection with the appended claims.

Figure 1:
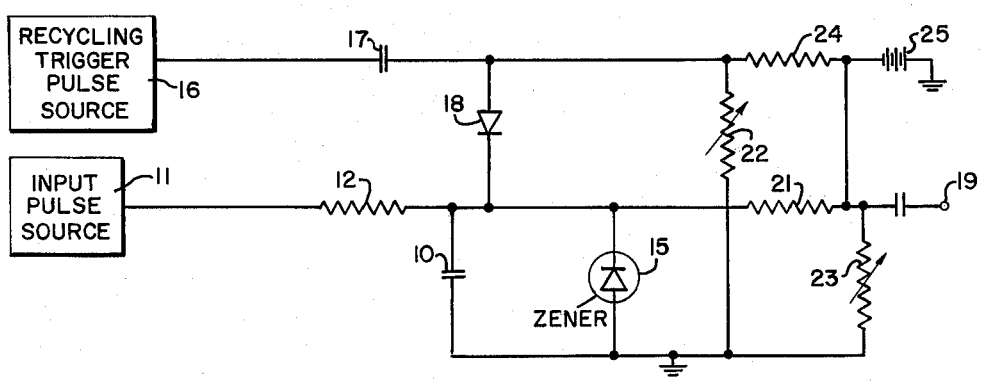
FIG. 1 illustrates a discharging circuit in accordance with this invention used in combination with an integrating means.
Figure 2:
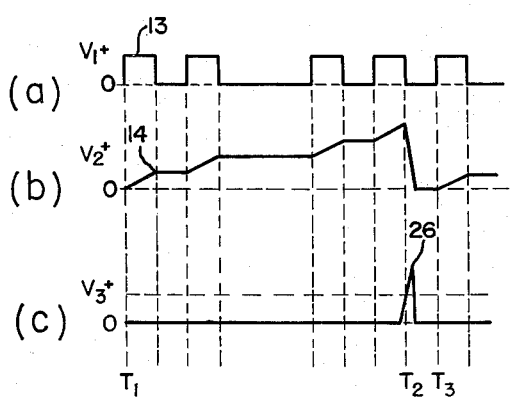
FIG. 2 illustrates various wave forms occurring in the operation of the circuit of FIG. 1.

In the illustrated embodiment of the invention shown in FIG. 1, an integrator in the form of a capacitor 10 is connected to a source of digital input pulses 11 through a resistor 12. Referring now to FIG. 2, diagram (a), illustrates the signal pulses from pulse source 11, data are supplied to the integrating capacitor 10 from the source of input pulses 11 in the form of square wave pulses of equal height and duration occurring at discrete intervals of time with no-signal period of equal duration occurring therebetween. Referring now to FIG. 2, diagram (b), illustrates the charge upon capacitor 10 during an integrating cycle. At the beginning of an integrating interval T1, no positive charge exists upon the integrating capacitor; as the first pulse 13 is applied to the integrator a capacitor charge is built up on the integrator during the duration of the charge. Each additional input pulse applied during the integrating interval from T1 to T2 increases the charge upon the capacitor so that the total charge upon the capacitor at any time is a direct measure of the number of input pulses that have been received during the integrating interval. Connected in parallel with the integrating capacitor is a Zener diode 15 through which the charge on the capacitor 10 is discharged at the end of an integrating cycle. The recycling trigger pulse source 16 is connected through an isolating capacitor 17 and conventional diode 18 to provide sharp positive spikes of voltage to the Zener diode 15 at time T2 as illustrated in diagram (c) of FIG. 2. The integrated voltage upon the capacitor 10 is supplied to the output terminal 19 through the coupling resistor 21. The variable resistors 22 and 23, resistor 24, and battery 25 comprise a biasing circuit whereby the Zener diode 15 is normally biased to non-conduction.

Figure 3:
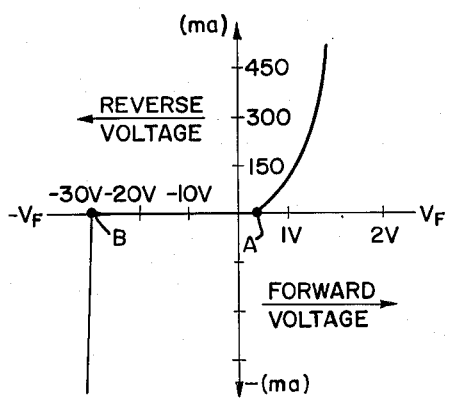
FIG. 3 illustrates the operating characteristics of a Zener diode as employed in this invention.

Referring now to FIG. 3, the Zener diode possesses a forward conduction characteristic much the same as a conventional diode. The application of a positive forward bias will result in conduction of the diode in the forward direction. Like the conventional diode, the Zener diode is non-conducting during the application of reverse voltages as in shown by the curve from points A to B. Unlike the convention diode, however, sufficient reverse voltage causes conduction in the reverse direction. The voltage required to cause reverse conduction is known as the breakdown voltage of the Zener diode and is indicated at point B. The diode presents an extremely low impedance to the passage of current after breakdown as is shown to the left of point B in FIG. 3; this feature is referred to as the avalanche characteristic of a Zener diode since current literally avalanches through the extremely low impedance presented thereby.

In the embodiment of FIG. 1, the Zener diode 15 is shown connected in parallel and in the reverse direction with the integrating capacitor 10. The battery 25 and the associated biasing resistors maintain the Zener diode 15 biased in the non-conducting region during the integrating cycle. At the completion of an integrating cycle, time T2 as shown in FIG. 2, a recycling trigger pulse 26 is applied to the Zener diode 15. The recycling trigger pulse 26 is of sufficient polarity and magnitude to cause breakdown of the Zener diode 15 in the reverse direction. The resulting low impedance due to the avalanche characteristic causes the charge on the capacitor 10 to be rapidly and fully discharged through the Zener diode 15 to ground. The signal pulses shown in FIG. 2 at (a) are each of a one micro-second duration as are the intervals between adjacent signal pulses. Upon application of the recycling trigger pulses at time T2, the entire charge on capacitor 10 is discharged in the interval between adjacent pulses thus making possible the recycling of the integrator without the necessity of delaying the flow of signal input pulses to the integrator before the next integrating cycle begins. Prior integrators using the slower recycling circuits could not accommodate a continuous flow of data at these speeds to the integrator. As a result, it was necessary to delay the flow of data or to actually remove data from the flow for the period required for the recycling operation. Since the use of the Zener diode greatly enhances the recycling speed, the delay or loss of data due to the integrating operation may be reduced or even eliminated.

It will be understood that various changes in the details, which have been hereindescribed and illustrated in order to explain the nature of the invention, may be made by those skilled in the art, within the principle and scope of the invention as expressed in the appended claims.

What is claimed is:

1. A circuit for recycling of an integrating element comprising a Zener diode connected in parallel with the integrating element, a source of signal pulses connected to said integrating element, bias means biasing said Zener diode to non-conduction during the integrating period, a trigger pulse source applying a pulse of voltage to said Zener diode to cause breakdown thereof in the reverse direction, whereby the integrator is short circuited by the low reverse impedance of said Zener diode and rapid discharge results from the avalanche characteristics of said Zener diode, and means connecting said integrating element to an output terminal.

2. An integrating unit comprising an integrator element, a source of signal pulses to be integrated connected to said integrator element, a Zener diode connected in parallel with said integrator element, bias means maintaining the Zener diode in a non-conducting state during the integrating period, a trigger pulse source connected to said Zener diode, said trigger pulse source providing a voltage pulse of sufficient magnitude to cause said Zener diode to conduct in the reverse direction, whereby said integrator element is discharged through said Zener diode, and means connecting said integrator element to an output terminal.

3. The integrating unit of claim 2 in which said integrator element is a capacitor.

References Cited in the file of this patent
UNITED STATES PATENTS

| | | |
|---|---|---|
| 2,915,648 | Chudleigh et al. | Dec. 1, 1959 |
| 2,983,850 | Edgerton | May 9, 1961 |